(12) United States Patent
Wamble, III et al.

(10) Patent No.: US 10,487,457 B2
(45) Date of Patent: Nov. 26, 2019

(54) VERTICAL SWITCHING IN A MAGNETIC LEVITATION GUIDEWAY TRANSPORTATION SYSTEM

(71) Applicant: SkyTran, Inc., Moffett Field, CA (US)

(72) Inventors: John Lee Wamble, III, Bothell, WA (US); John Cole, Dana Point, CA (US)

(73) Assignee: SkyTran, Inc., Moffett Field, CA (US)

( * ) Notice: Subject to any disclaimer, the term of this patent is extended or adjusted under 35 U.S.C. 154(b) by 227 days.

(21) Appl. No.: 15/508,900

(22) PCT Filed: Sep. 4, 2015

(86) PCT No.: PCT/US2015/048655
§ 371 (c)(1),
(2) Date: Mar. 3, 2017

(87) PCT Pub. No.: WO2016/037116
PCT Pub. Date: Mar. 10, 2016

(65) Prior Publication Data
US 2017/0183829 A1    Jun. 29, 2017

Related U.S. Application Data

(60) Provisional application No. 62/046,843, filed on Sep. 5, 2014.

(51) Int. Cl.
*E01B 25/34*    (2006.01)
*B60L 13/04*    (2006.01)

(52) U.S. Cl.
CPC .............. *E01B 25/34* (2013.01); *B60L 13/04* (2013.01); *B60L 2200/26* (2013.01)

(58) Field of Classification Search
CPC . E01B 7/00; E01B 25/00; E01B 25/30; E01B 25/32; E01B 25/34; B60L 13/00;
(Continued)

(56) References Cited

U.S. PATENT DOCUMENTS 3,797,402 A  *  3/1974  Karch .................... B61B 13/08
104/130.02
3,847,086 A     11/1974  Steenbeck
(Continued)

FOREIGN PATENT DOCUMENTS

CN        1643219 A       7/2005
CN     200978375 Y      11/2007
(Continued)

OTHER PUBLICATIONS

International Search Report and Written Opinion by the International Searching Authority for the corresponding International Patent Application PCT/US2015/048655, dated Dec. 2, 2015, 11 pages.
(Continued)

*Primary Examiner* — Robert J McCarry, Jr.
(74) *Attorney, Agent, or Firm* — Polsinelli PC

(57) ABSTRACT

A track switch for a magnetic levitation transport system includes a trunk segment of track, an upper branch segment of track, a lower branch segment of track, and a divergent zone. The divergent zone has coextensive spaced rails extending from the trunk segment and splitting into upper rails extending to the upper branch segment, and lower rails extending to the lower branch segment, so that a vehicle engaging the rails and entering the switch at the trunk segment is guided and magnetically levitated to a selected one of either the upper branch segment or the lower branch segment.

20 Claims, 15 Drawing Sheets

(58) Field of Classification Search
CPC .......... B60L 13/03; B60L 13/04; B60L 13/06; B60L 13/10; B61B 13/08
See application file for complete search history.

(56) References Cited

U.S. PATENT DOCUMENTS

| | | | |
|---|---|---|---|
| 5,094,172 | A | 3/1992 | Kummer |
| 5,094,712 | A * | 3/1992 | Becker .............. H01L 21/31116 252/79.1 |
| 8,171,858 | B2 | 5/2012 | Wamble, III |
| 8,215,591 | B2 | 7/2012 | Roop |
| 2010/0199876 | A1 | 8/2010 | Wamble |
| 2011/0011298 | A1 | 1/2011 | Timperman |
| 2013/0327244 | A1 | 12/2013 | Robbert et al. |

FOREIGN PATENT DOCUMENTS

| | | |
|---|---|---|
| CN | 101392480 A | 3/2009 |
| CN | 101821455 A | 9/2010 |
| CN | 103938507 A | 7/2014 |
| EP | 0389616 B1 | 5/1993 |
| GB | 1404648 A | 9/1975 |
| WO | WO 01/49544 A1 | 7/2001 |
| WO | WO 2013/003387 A2 | 1/2013 |
| WO | WO 2016/037116 | 3/2016 |

OTHER PUBLICATIONS

Extended European Search Report from the European Patent Office, dated Apr. 19, 2018, 9 pages, for the corresponding European Patent Application No. 15838649.0.
English translation of the Search Report, dated Dec. 24, 2018, 1 page, for the corresponding Taiwan Patent Application No. 104129566.
English translation of the First Office Action from the State Intellectual Property Office of P.R. China, dated Aug. 3, 2018, 3 pages, for the corresponding Chinese Patent Application No. 201807310180060.
English translation of granted Chinese Patent CN100526555C, for Chinese Patent Publication CN1643219A, published on Jul. 20, 2005, (translation from Espacenet on Jan. 22, 2019, 11 pages).
English translation of Chinese Patent Publication CN200978375Y, published on Nov. 21, 2007, (translation from Espacenet, Jan. 22, 2019, 12 pages).
English translation of Chinese Patent Publication CN103938507, published on Jul. 23, 2014, (translation from Espacenet, Jan. 22, 2019, 12 pages).
English translation of the Abstract for EP0389616B1, published May 26, 1993, (translation from Espacenet Jan. 22, 2019, 1 page).
English translation of the Abstract for CN101392480A, published Mar. 25, 2009, (translation from Espacenet Jan. 22, 2019, 1 page).
English translation of the Abstract for CN101821455A, published Sep. 1, 2010, (translation from Espacenet Jan. 22, 2019, 1 page).

\* cited by examiner

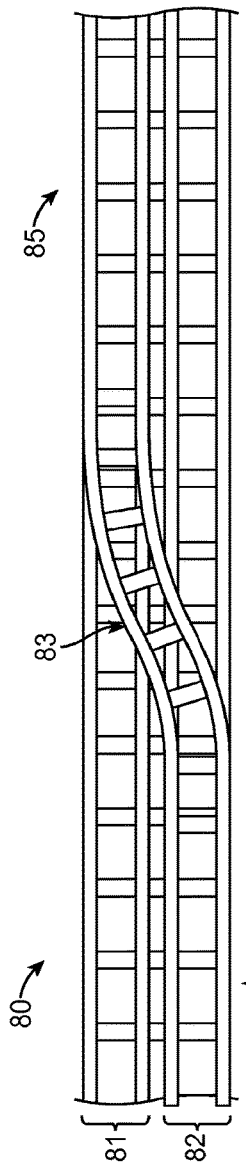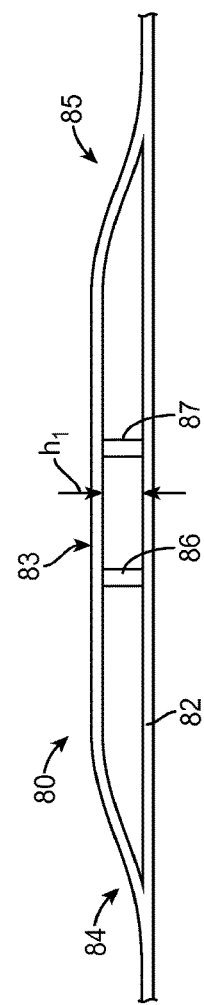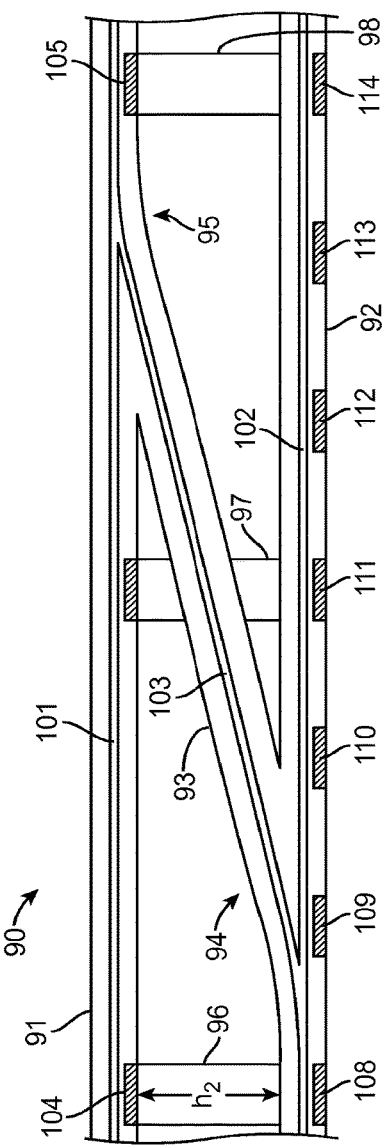

VERTICAL SWITCHING IN A MAGNETIC LEVITATION GUIDEWAY TRANSPORTATION SYSTEM

CROSS REFERENCE TO RELATED APPLICATIONS

This application is a U.S. National Stage Entry of PCT Application No. PCT/US2015/048655, filed Sep. 4, 2015, which claims priority to U.S. Provisional Application No. 62/046,843, filed Sep. 5, 2014, the contents of which are entirely incorporated by reference herein.

FIELD

The present disclosure generally relates to switching of a vehicle between alternative paths in a magnetic levitation guideway transportation system.

BACKGROUND

Levitation can provide advantages compared to conventional wheels on tracks. The levitation can be magnetic levitation. Generally, magnetic levitation has low or zero mechanical friction and thus parts in levitation systems do not wear from contact. Magnetic levitation has a wide range of speeds over which it can operate, and in operation it generates relatively low noise levels.

Magnetic levitation can be applied to traditional large train system architecture as well as monorail or personal rapid transport (PRT) systems. Magnetic levitation can use active or passive magnetic interaction for levitation and centering functions, and can use inductive or synchronous magnetic interaction for propulsion. For example, a networked guideway transit system can use permanent magnet coupling to provide primary lift passively with motion, and can use electrodynamic repulsion to create centering forces at most operational speeds while integrating linear motor functions with electrodynamic centering functions. See, for example, Wamble, III et al. U.S. Pat. No. 7,562,628 issued Jul. 21, 2009, incorporated herein by reference, and Wamble, III et al. U.S. Pat. No. 8,171,858 issued May 8, 2012, incorporated herein by reference. A propulsion unit can be either integrated with or separate from a levitation unit.

For example, a propulsion unit separate from the levitation unit is described in Wamble III, International Publication WO 2013/003387 A2 published Jan. 3, 2013, incorporated herein by reference. A vehicle is levitated by one or more of the levitation units (for example, 410 in FIGS. 2, 3, 4, 9, 10, 11A, 11B of WO 2013/003387 A2), and each levitation unit has one or more elongated magnetic poles. When the vehicle engages the track, each elongated magnetic pole is adjacent to a flat vertical surface of a stationary electrically conductive rail of the track, and the elongated magnetic pole is inclined at a variable angle. When the elongated magnetic pole moves along the rail, the magnetic field from the elongated magnetic pole induces eddy currents in the rail, and the eddy currents in the rail produce lift upon the elongated magnetic pole. Under some typical operating conditions, the lift is generally proportional to the angle of inclination and the velocity of the vehicle. (See paragraphs [0066] to [0072] of WO 2013/003387 A2.)

A guideway switch is a piece of guideway that makes possible the splitting or merging of paths. A guideway switch is an important and valuable technological feature for constructing guideway networks of multiple lines of guideway. By switching a vehicle from one line to another, passengers or freight need not be transferred to another vehicle on the other line.

BRIEF DESCRIPTION OF THE DRAWINGS

FIG. 21 is a top view of a track network in which two parallel, coplanar, and adjacent tracks are joined by an overpass and a track switch in each of the two parallel tracks;

FIG. 22 is a side view of the track network introduced in FIG. 21;

FIG. 23 is a side view of a track network in which two parallel and adjacent tracks are spaced one on top of the other and joined by an incline and a track switch in each of the two parallel tracks;

Figure 1:
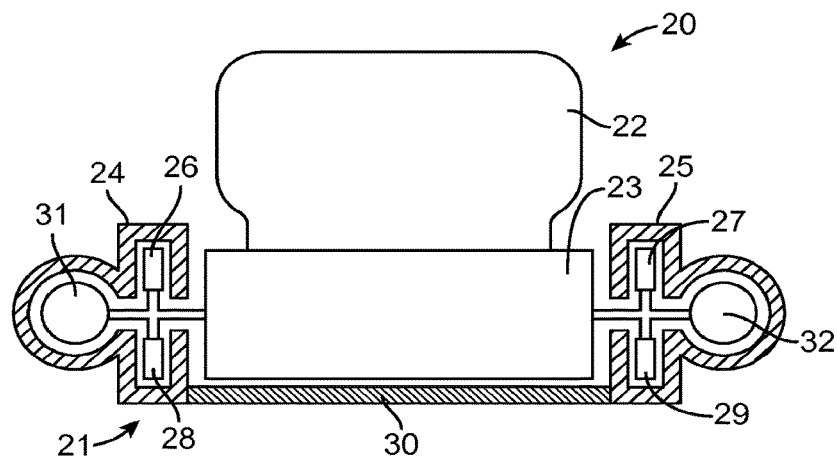
FIG. 1 is lateral cross-section of a track having a pair of coextensive spaced rails, and a rear view of a vehicle engaged with the rails according to the present disclosure.

The various embodiments described above are provided by way of illustration only and should not be construed to limit the scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached claims. It will therefore be appreciated that the embodiments described above can be modified within the scope of the appended claims. Claim language reciting "at least one of" a set indicates that one member of the set or multiple members of the set satisfy the claim.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure is directed to switching of a vehicle between alternative paths in a guideway transportation system including segments of track in which each track segment is comprised of a pair of coextensive and spaced guide rails. The guide rails in each segment are spaced from each other by a constant distance and are generally coplanar in a horizontal or inclined plane or are banked over curves in a fashion similar to conventional railroad track. The present track can be comprised of a pair of coextensive spaced guide rails. When two rails and two reaction tubes are provided, the system is capable of carrying heavier loads at high speeds because the weight and inertial forces from the loads are distributed over a wider area of the guideway, as compared to a single rail and single reaction tube. Also vehicles riding on top of co-extensive spaced rails have some advantages in ride stability, safety with respect to collisions with tall trucks passing under the guideway, operation in stations where the guideway is located on a ground plane, and walkways that can be on the ground plane and level with the guideway.

If switching of the track were done in a way similar to the switching of conventional railroad track, a segment of the track at the divergent zone of a switch would be mechanically pivoted at a trunk segment to join the trunk segment selectively with either a first branch segment or a second branch segment. Also, for switching vehicles traveling at high speeds, the track segment at the divergent zone should also be flexible so that it would curve selectively one way or the other to provide a smooth transition from the trunk segment with the selected branch segment. The present disclosure offers significant improvements over a traditional track switch.

The present disclosure solves does not require the use of moving parts in the track and minimizes the mass of magnets for adequate system dynamic behavior in the switch divergent zone. The rails in the divergent zone can diverge vertically, which is in a direction generally perpendicular to the plane of the track, so that there is no crossing of rails in the divergent zone. The direction need not be exactly perpendicular to be generally perpendicular. For example, the track could be in the shape of a curve and the rails can diverge in a direction that is normal to gravity. In at least one arrangement, a mainline of the network is in a horizontal plane over the divergent zone, and switching is done by routing vehicles to or from vehicle paths above or below the mainline.

The vertical switching is compatible with switching high-speed vehicles that are magnetically levitated passively by the interaction of magnets mounted to the vehicle and engaged with the rails. The lift is due to force from one or more eddy currents magnetically induced in the rails, so that the force generally increases with vehicle speed, and the magnets and the rails can be designed to carry at least twice the gross mass of the vehicle at normal operating velocity. In this case, each rail can split so that each half of the rail diverges vertically from the other half, and the gross mass of a vehicle passing through the divergent zone will still be levitated by a pair of the half-rails regardless of the selected path through the divergent zone. While the illustrated embodiments disclose horizontal motion and vertically divergent zones, it is within the scope of this disclosure to implement the system with vertical motion and/or horizontally divergent zones. Further, while the disclosure refers to a divergent zone, the system can also be implemented with a converging zone, or other track merging systems such that two or more tracks can become a single track and/or more than one track can become a single track, or any combinations thereof.

FIG. 1 shows a specific example of a vehicle 20 and track 21. The vehicle 20 includes a passenger or freight cabin 22 and a bogie 23 supporting the cabin 22 and disposed between two parallel-spaced horizontal rails 24, 25 of the track 21. The rails 24, 25 are interconnected by a crosstie 30 beneath the bogie 23. The width of the cabin 22 is less than the spacing between the rails 24, 25 to provide sufficient clearance between the cabin and the rails of an upper branch track (73 in FIG. 4) of a vertically divergent track switch (70 in FIG. 4). Levitation and centering units 26, 27, 28, and 29 are disposed within the rails 24, 25 and mounted to the bogie 23. The levitation and centering units 26, 27, 28, and 29 can be passive permanent magnets or electromagnets, or they can include actively switched electromagnets.

Magnetic propulsion units 31, 32 are also disposed within the rails 24, 25 and mounted to the bogie 23. For example, each magnetic propulsion unit 31, 32 includes a spinning helical array of permanent magnets, as further described in Wamble III, International Publication WO 2013/003387 A2 published 3 Jan. 2013, incorporated herein by reference. In an alternative construction, a conventional electromagnetic propulsion unit, such as a three-phase linear induction motor driver, can be integrated with the levitation and centering units 26, 27, 28, 29.

The rails 24, 25 and the levitation and centering units 26, 27, 28, 29 and the propulsion units 31, 32 are configured so that each rail 24, 25 can be split into an upper half 41, 42 and a lower half 43, 44 and the vehicle 20 can be magnetically levitated only by either the two upper halves 41, 42 or the two lower halves 43, 44 when the vehicle 20 is traveling at an operational speed.

Figure 2:
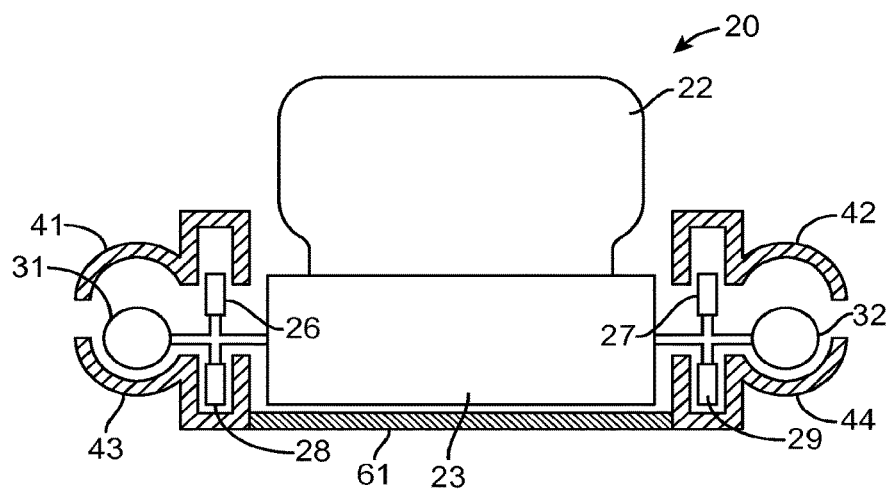
FIG. 2 is a lateral cross-section of the track of FIG. 1 at a vertically-switching divergent zone in the track, and a rear view of the vehicle of FIG. 1 for the case of the vehicle following a lower alternative path through the divergent zone.

As shown in FIG. 2, the vehicle 20 is supported by the lower rail halves 43, 44. In this case, the vehicle 20 has traveled into the divergent zone of a track switch, and the vehicle and has been retained in the lower rail halves 43, 44. In at least one embodiment, the vehicle 20 can contain logic to select the lower rail halves 43, 44 depending upon the desired direction of travel. The computer can include memory, a controller that includes non-transitory memory, one or more processors, at least one output device being coupled to at least one mechanical component of the vehicle 20.

Figure 3:
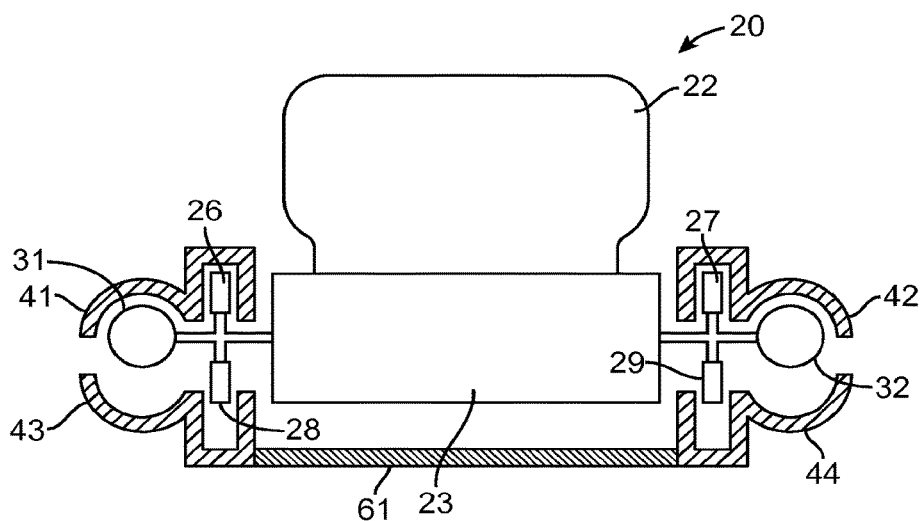
FIG. 3 is a lateral cross-section of the track of FIG. 1 at the vertically-switching divergent zone in the track, and a rear view of the vehicle of FIG. 1 for the case of the vehicle following an upper alternative path through the divergent zone.

As shown in FIG. 3, the vehicle 20 is supported by the upper rail halves 41, 42. In this case, the vehicle 20 has traveled into the divergent zone of the track switch, and the vehicle has been retained in the upper rail halves 41, 42. In at least one embodiment, the vehicle 20 can contain path control logic to select the upper rail halves 41, 42 depending upon the desired direction of travel. The computer can include memory, a controller that includes non-transitory memory, one or more processors, at least one output device being coupled to at least one mechanical component of the vehicle 20.

Figure 4:
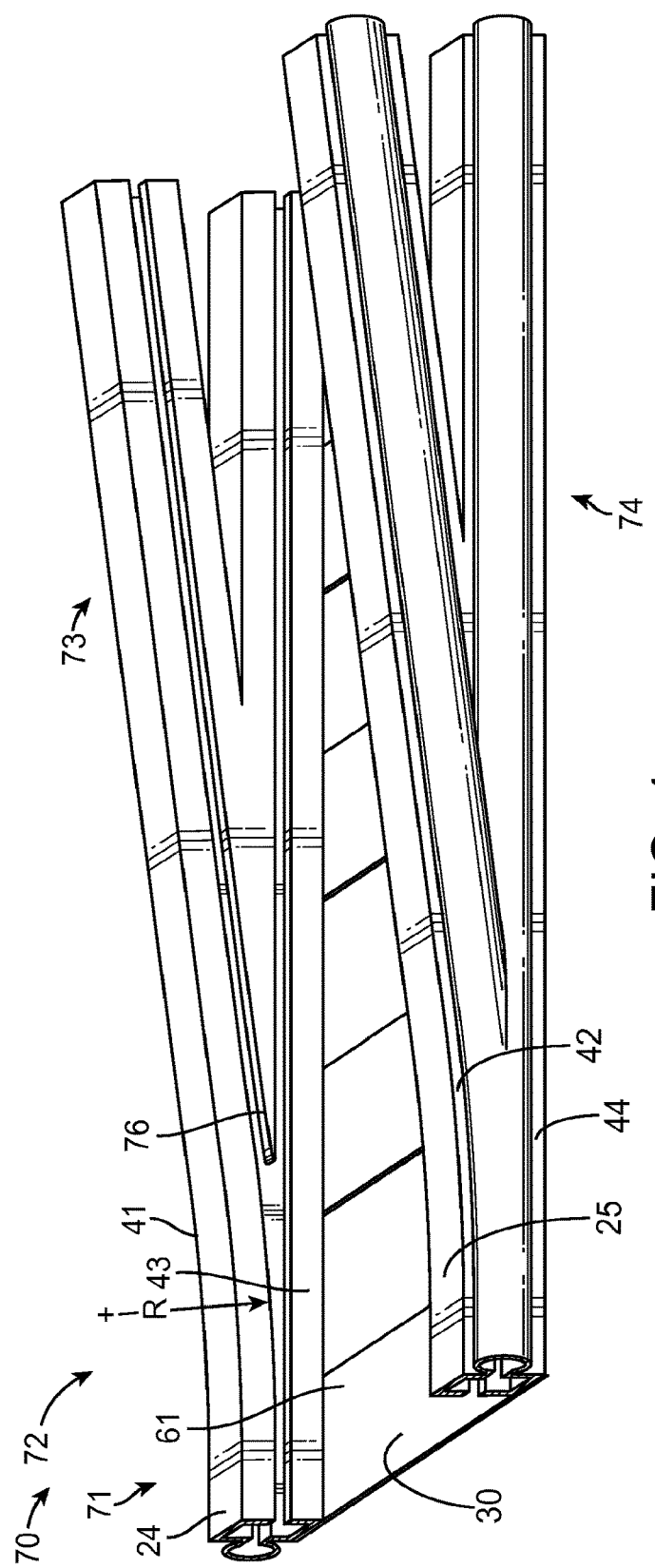
FIG. 4 is a perspective view of a track switch in the track introduced in FIG. 1.

FIG. 4 shows the vertically divergent track switch 70 in the track introduced in FIG. 1. The track includes crossties 30, 61 joining the rails 24, 25 and keeping a constant spacing between the rails. The track switch 70 includes a trunk track segment 71, a divergent zone 72, an upper branch track segment 73, and a lower branch track segment 74. The divergent zone 72 joins the trunk track segment 71 to the upper branch track segment 73 and the lower branch track segment 74.

In the divergent zone 72, the rails 24, 25 gradually split vertically into the respective upper half rails 41, 42 and lower half rails 43, 44. In the specific example of FIG. 4, the rails are split so that the upper halves 41, 42 gradually curve upward from the lower halves 43, 44, which are straight and horizontal. The divergent zone 72 ends and the branch track segments 73, 74 begin at a mechanical deflector 76 that would deflect a vehicle traveling from the trunk track segment 71 to either the upper branch track segment 73 or the lower branch track segment 74 if a component of the vehicle (for example, a connecting rod 213 in FIG. 6 or a roller 226 in FIG. 9) extending into the track from a side of the vehicle would contact the deflector. The deflector 76 is formed from a merging of a lower portion of the upper branch track segment 73 and an upper portion of the lower branch track segment 74. In the configuration of FIG. 4, in the absence of an applied force upon a vehicle for selecting a path of the vehicle through the divergent zone 72, the vehicle would follow the straight and horizontal path from the trunk track 71 to the lower branch track 74.

The curvature of the path from the trunk track 71 to the upper branch track 73 has a relatively large radius of curvature "R" in order to minimize the force needed for directing the vehicle to the upper branch track when the path to the upper branch track is selected. Also, the curvature along the path from the trunk track 71 to the upper branch track 73 changes gradually to reduce jerk when a vehicle is diverted to the upper branch track. For example, the curvature is parabolic or hyperbolic rather than a circular arc.

In practice, the radius of curvature "R" is much larger than that shown in FIG. 4 because the force needed for directing the vehicle to the upper branch track 73 is inversely proportional to the radius of curvature and directly proportional to the square of the speed of the vehicle. In particular, in FIGS. 4 and 5, the length along the track has been compressed by a factor of 10 to 100 or more in order to emphasize the operational characteristics of the track switch 70.

In at least one embodiment, as described further below with reference to FIGS. 6-15, at very low speeds, the vehicle 20 passes through the switch 70 in only three ways. The first way is from the trunk track 71 to the lower branch track 74. The second way is from the lower branch track 74 to the trunk track 71. The third way is from the upper branch track 73 to the trunk track 71. In these cases, the vehicle 20 would slide or roll upon the rails. For example, rollers (for example, 226 in FIG. 9) are mounted to the bogie 23, and these rollers engage and contact the rails when the magnetic levitation force no longer supports the weight of the vehicle 20. These rollers could also engage and contact the rails to support the weight of the vehicle at passenger or freight loading platforms where the vehicle would be stationary. Moreover, some additional track or supporting platform structure could be provided in these areas to allow for the vehicle to use special devices to travel on the additional track or supporting platform structure. Still further, additional supporting structure (such as wheels mounted to the bottom of the bogie 23) could be present in those areas in which the vehicle will be resting substantially or partially on the track or disengaged from the track and resting on a passenger or freight loading platform.

Figure 5:
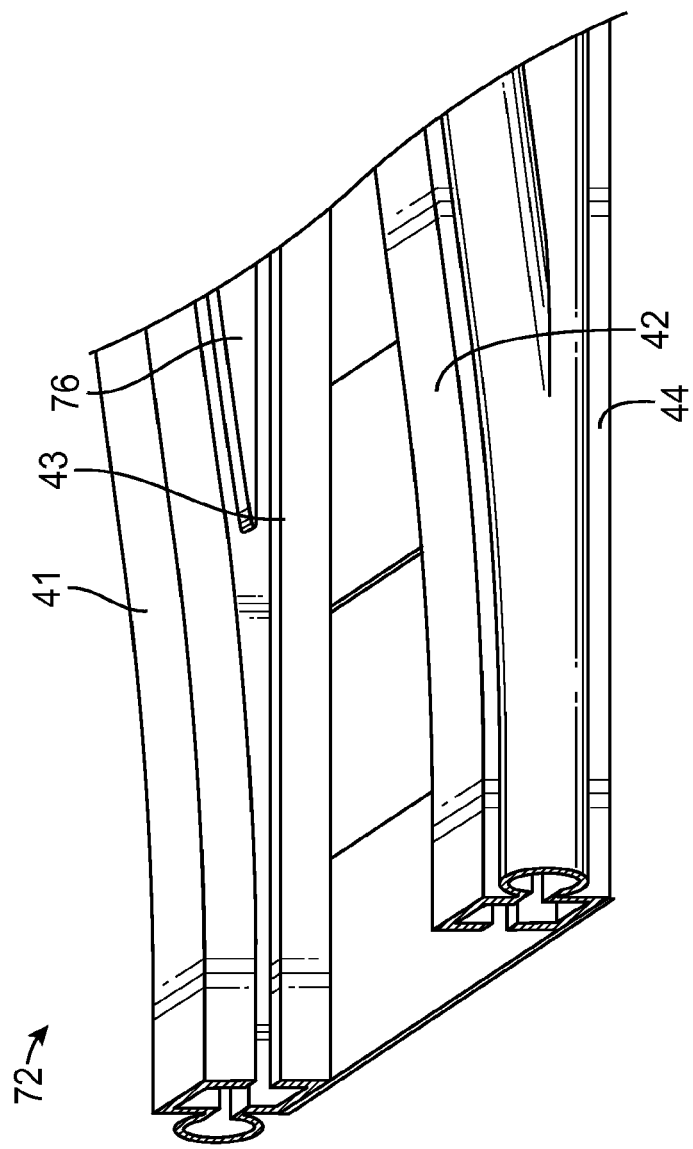
FIG. 5 is an enlarged view of the divergent zone in the track switch of FIG. 4.

For example in FIGS. 4 and 5, when a vehicle enters the divergent zone 72 from the branch track segment 71, the levitation units of the vehicle can apply an additional levitating force to the vehicle to select the upper branch path instead of the lower branch path. This could be done electrically or mechanically. For example, by using levitation units as described in Wamble III, International Publication WO 2013/003387, this can be done mechanically by tilting the levitation units to increase the inclination of the levitation units. This will now be described in relation to FIGS. 6 to 15.

Figure 6:
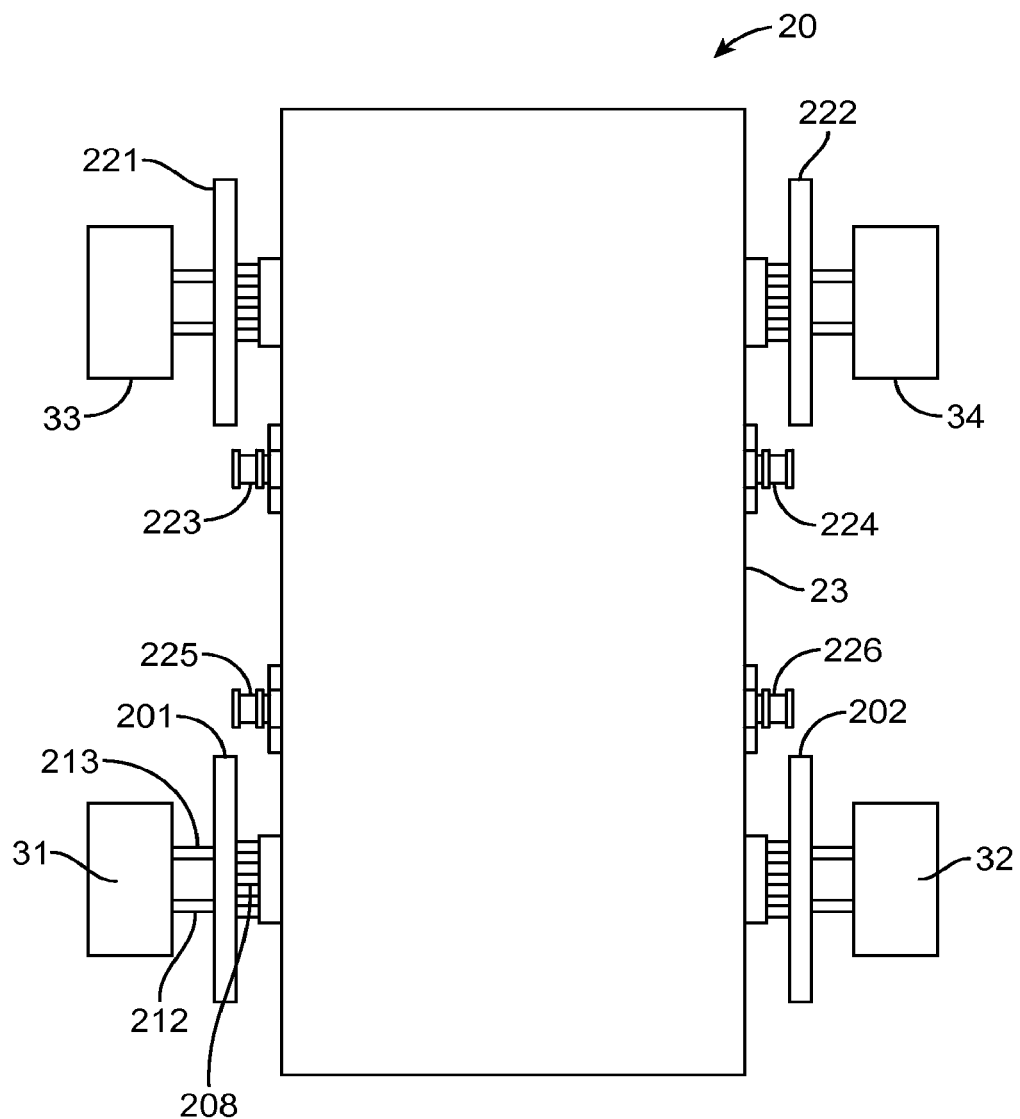
FIG. 6 is a diagrammatic view of a vehicle including propulsion and levitation units and roller units extending from the left and right sides of the vehicle.

FIG. 6 is a top view of the vehicle 20 showing the bogie 23 and the propulsion units 31, 32, 33, 34 and levitation units 201, 202, 221, 222 extending from the left and right sides of the vehicle. In at least one embodiment, the propulsion units 31, 32, 33, 34 and levitation units 201, 202, 221 are configured such that they can be retracted inside of the bogie 23. The propulsion units 31, 32, 33, 34 and levitation units 201, 202, 221, 222 can be retracted for example when the vehicle 20 is at a station or other point at which passengers embark or disembark or where cargo is loaded or unloaded. In this configuration, appropriate shielding can be provided inside the bogie 23 to provide for increased safety performance. In other embodiments, the propulsion units 31, 32, 33, 34 and levitation units 201, 202, 221, 222 can be configured to remain in position. In still in other embodiments, the propulsion unites 31, 32, 33, 34 and levitation units 201, 202, 221, 222 can be configured to be variably positioned to allow for adjustments to the track configurations and or loading configurations.

FIG. 6 also shows roller units 223, 224, 225, 226 extending from the left and right sides of the vehicle 20. The roller units 223, 224, 225, 226 are configured to engage the track to support and guide the vehicle 20 when the speed of the vehicle is insufficient for the levitation units 201, 202, 221, 222 to levitate the vehicle. The roller units 223, 224, 225, 226 can also provide points of contact with the rails to guide the vehicle 20 under abnormal conditions. For example, under normal conditions when the vehicle is traveling at an operational speed for magnetic levitation, the roller units 223, 224, 225, 226 would not contact the rails.

Figure 7:
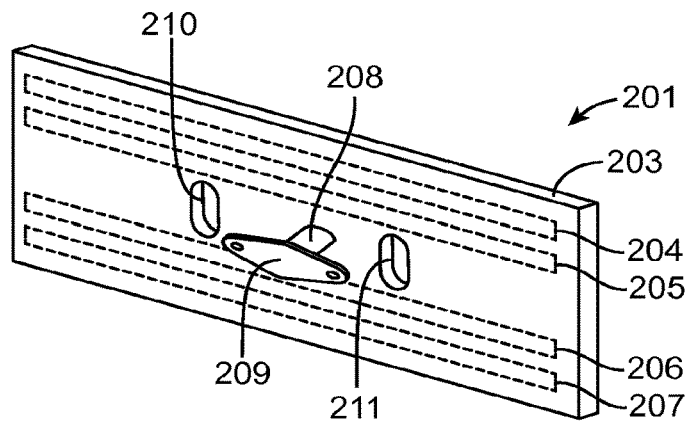
FIG. 7 is perspective view of one of the levitation units introduced in FIG. 6.

FIG. 7 shows the levitation unit 201 in isolation. The levitation unit 201 includes an elongated rectangular plate 203, a central shaft 208 fastened to and protruding from one side of the rectangular plate 203, and a control arm 209 secured to the central shaft 208. The elongated rectangular plate 203 has two arcuate holes 210, 211 symmetrically arranged about the shaft 208. The holes 210, 211 permit support rods (212, 213 in FIG. 6) to pass through the rectangular plate 203 for mounting of the associated propulsion unit (31 in FIG. 6) to the bogie (23 in FIG. 6).

For providing lift, the elongated rectangular plate 203 includes multiple elongated magnetic poles 202, 203, 204, 205. For example, each elongated magnetic pole includes a row of rare earth permanent magnets, and in each row, the north poles of the magnets are aligned on one side of the plate 203, and the south poles of the magnets are aligned on the other side of the plate 203. Neighboring rows have their poles reversed. For example, the rectangular plate 203 is made of two parallel aluminum plates, and the magnets are sandwiched between the two aluminum plates.

When the vehicle (20 in FIG. 6) is traveling at an operational speed through the divergent zone of the switch (72 in FIG. 4) from the trunk segment of track (71 in FIG. 4) to the upper branch segment of track (73 in FIG. 4), an upper half of the elongated permanent magnetic poles (for example, 204, 205 in FIG. 7) in the levitation units (201, 202, 221, 222 in FIG. 6) are able to levitate the vehicle by magnetic coupling with the upper halves (41, 42 in FIG. 4) of the coextensive spaced rails in the divergent zone. When the vehicle (20 in FIG. 6) is traveling at an operational speed through the divergent zone of the switch (72 in FIG. 5) from the trunk segment of track (71 in FIG. 4) to the lower branch segment of track (74 in FIG. 4), a lower half of the elongated permanent magnetic poles (for example, 206, 207 in FIG. 7) in the levitation units (201, 202, 221, 222 in FIG. 6) are able to levitate the vehicle by magnetic coupling with the lower halves (43, 44 in FIG. 4) of the coextensive spaced rails in the divergent zone.

Figure 8:
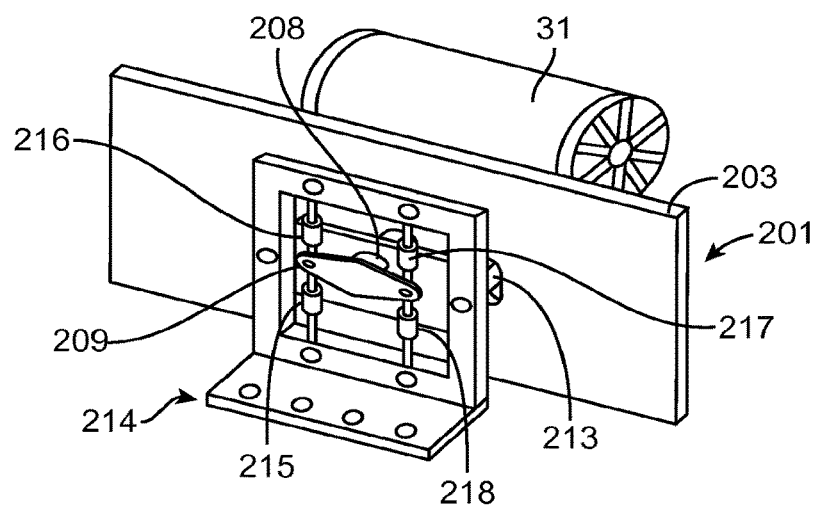
FIG. 8 is a perspective view of an assembly of the levitation unit of FIG. 7 with a propulsion unit and a mounting bracket for mounting the levitation unit and the propulsion unit to the vehicle.

FIG. 8 shows an assembly of the levitation unit 201 and the associated propulsion unit 31 with a mounting bracket 214 for mounting the levitation unit 201 and the propulsion unit 31 to the bogie of the vehicle. The position of the propulsion unit 31 is fixed with respect to the mounting bracket 214. However, the shaft 208 of the levitation unit 201 is journaled to the mounting bracket 214 so that the position of the levitation unit 201 is fixed axially with respect to the mounting bracket along the shaft 208 but the levitation unit 201 can tilt about the axis of the shaft. Therefore the levitation unit 201 can tilt with respect to the mounting bracket 214 and also with respect to the bogie when the mounting bracket 214 is mounted to the bogie. To precisely control the angle of inclination of the levitation unit 201, actuators 215, 216, 217, 218 are mounted between the control arm 209 and the mounting bracket 214.

Figure 9:
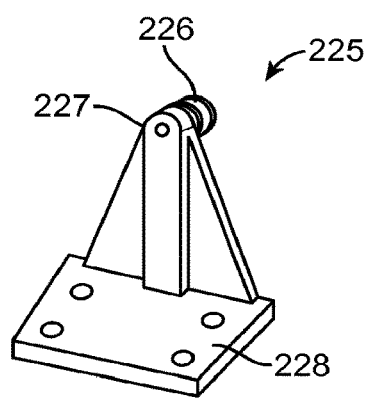
FIG. 9 is a perspective view of an assembly of one of the roller units introduced in FIG. 6 and a mounting bracket for mounting the roller unit to the vehicle.

FIG. 9 shows details of the roller unit 225. The roller unit 225 includes a roller 226 journaled to a shaft 227 fixed to a mounting bracket 228 for mounting the roller to the bogie of the vehicle 20.

Figure 10:
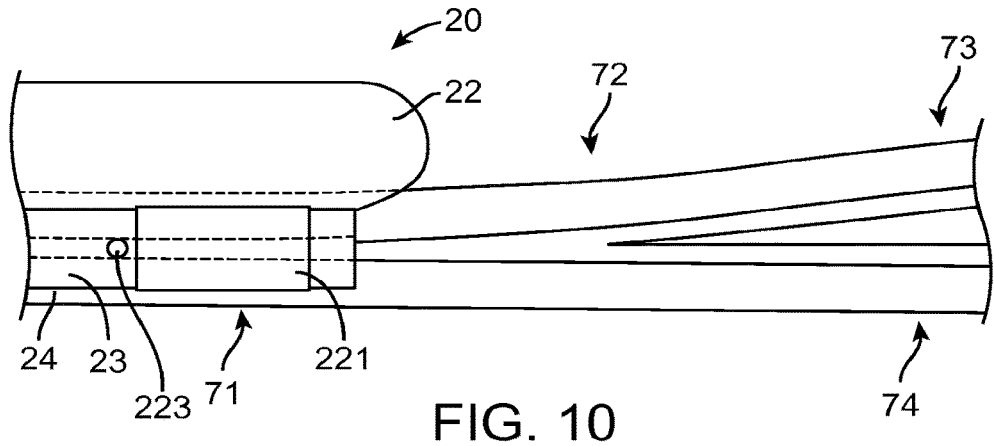
FIGS. 10, 11, and 12 show side views of the rails at the divergent zone of the switch of FIG. 5 at progressive instants in time when a vehicle from a trunk track enters the divergent zone and continues to a lower branch of the switch.
Figure 11:
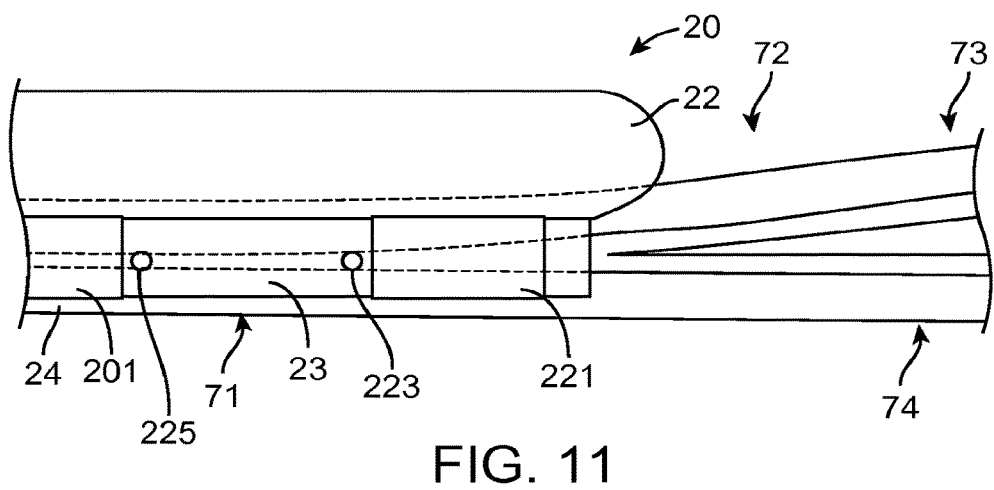
Figure 12:
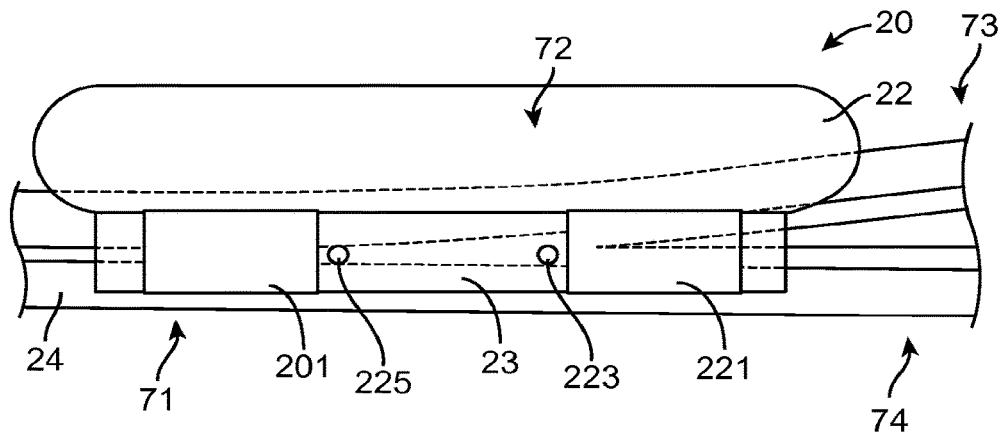

FIGS. 10, 11, and 12 show side views of the vehicle 20 and one of the rails 24 at the divergent zone of FIG. 5 at progressive instants in time when the vehicle 20 enters the divergent zone 72 from the trunk track segment 71 and continues to the lower branch track segment 74. In this case, the tilt of the levitation units 201, 221 is not increased appreciably when the vehicle 20 enters the divergent zone 72. Instead, the tilt is controlled to keep the vehicle 20 moving horizontally to direct the vehicle to the lower branch track segment 74.

Figure 13:
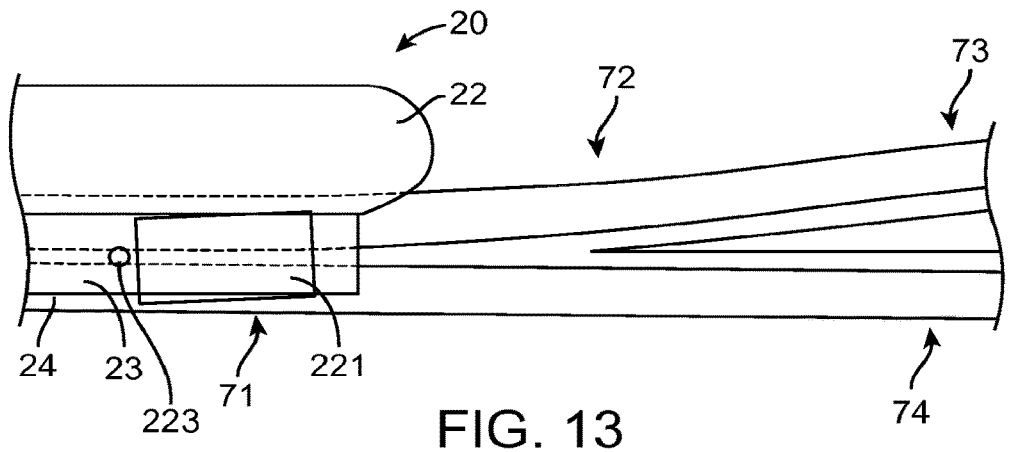
FIGS. 13, 14, and 15 show side views of the rails at the divergent zone of the switch of FIG. 5 at progressive instants in time when a vehicle from a trunk track enters the divergent zone and is directed towards an upper branch of the switch.
Figure 14:
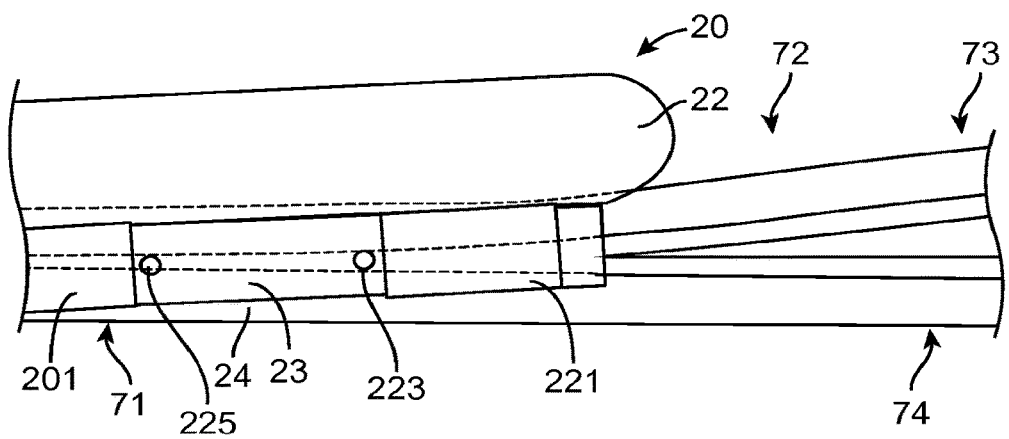
Figure 15:
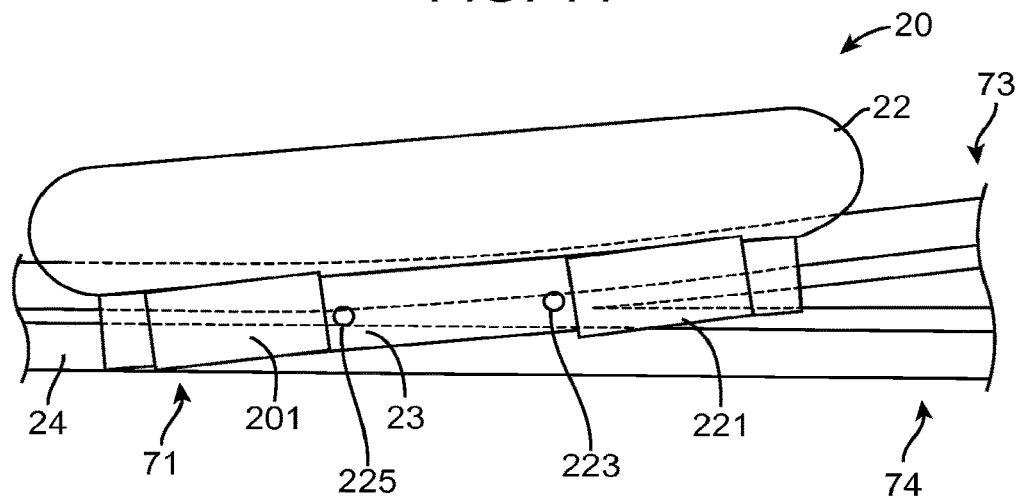

FIGS. 13, 14, and 15 show side views of the vehicle 20 and one of the rails 24 at the divergent zone 72 of FIG. 5 at progressive instants in time when the vehicle 20 enters the divergent zone 72 from the trunk track segment 71 and is directed to the upper branch track segment 73. In this case, the tilt of the propulsion units 201, 221 is increased appreciably when the vehicle 20 enters the divergent zone 72 so that the vehicle is lifted to the upper branch track segment 73. The tilt is controlled to direct the vehicle 20 along the curved path from the trunk track segment 71 to the upper branch track segment 73.

Figure 16:
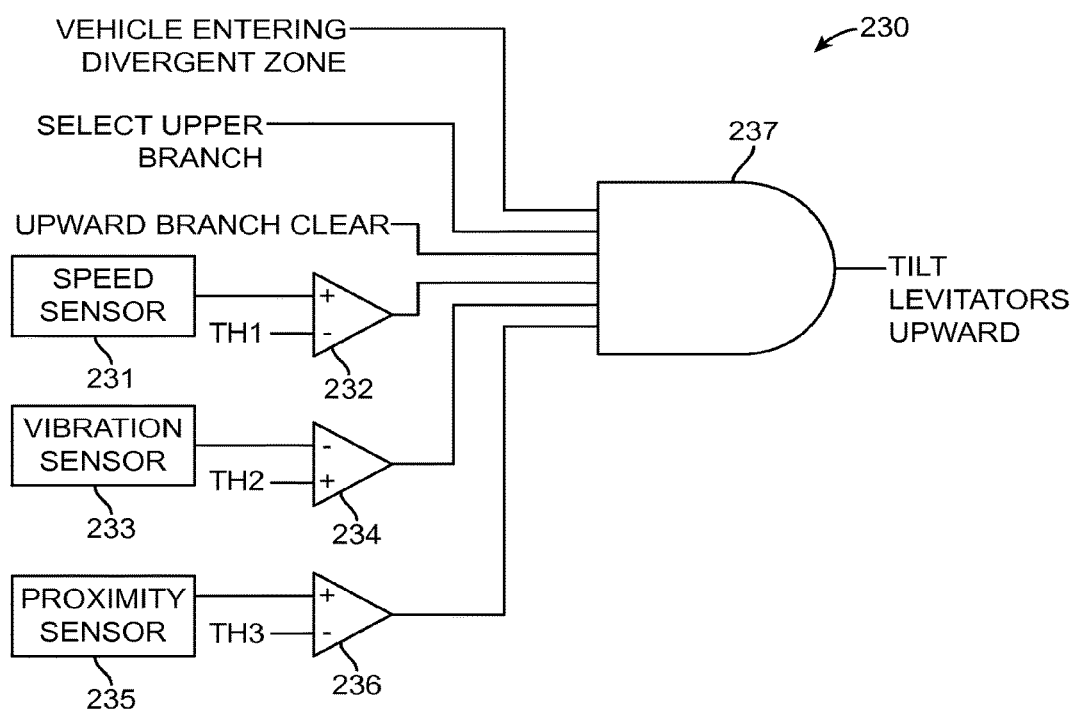
FIG. 16 shows control logic for enabling a vehicle from a trunk track entering the divergent zone of the switch to be switched to the upper branch of the switch.

FIG. 16 shows control logic 230 for enabling a vehicle entering the divergent zone of the switch from the trunk track segment to be switched to the upper branch track segment. The control logic 230 will not tilt the levitation units upwards to direct the vehicle to the upper branch track segment unless the vehicle is entering the divergent zone from the trunk track segment, the driver of the vehicle or the conductor of the system has selected the upper branch track segment, the upper branch track segment is clear, and the vehicle is traveling at a sufficient speed to provide the required additional lift, and the vehicle is traveling smoothly and is under good control. In at least one embodiment, the system can automatically switch for traffic avoidance, and/or destination control. A speed sensor 231 senses the speed of the vehicle, and a first comparator 232 compares the sensed speed to a first threshold TH1 to determine whether the vehicle is traveling at a sufficient speed to provide the required additional lift. A vibration sensor 233 senses vibration, and a second comparator 234 compares the sensed vibration to a second threshold TH2 to determine whether the vehicle is traveling smoothly. A proximity sensor 235 senses clearance between the track and the propulsion and levitation units of the vehicle, and a third comparator 236 compares the clearance to a third threshold TH3 to determine whether there is sufficient clearance indicating that the vehicle is traveling under good control. A logical AND gate 237 combines control inputs (vehicle entering divergent zone, select upper branch, and upward branch clear) with signals from the comparators 232, 233, 234 in order to enable tilting of the levitation units upwards to direct the vehicle to the upper branch track segment when all of the control inputs and comparators assert logic high signals indicating that all of the required conditions are met for directing the vehicle from the trunk track segment to the upper branch track segment.

The selection of either the upper branch or the lower branch for a vehicle entering the divergent zone of the vertical track switch from the trunk branch could also be performed electrically or mechanically by changing the electrical characteristics or mechanical configuration of the track in the divergent zone of the vertical track switch. For example, the electrical characteristics or mechanical configuration of the track in the divergent zone can be changed if the levitation units of the vehicle does not already have the capability of controlling lift to select the path through the divergent zone of the switch, and the transport system would have many more vehicles than track switches. Selection of either the upper branch or the lower branch by changing the electrical characteristics of the track in the divergent zone of the vertical track switch can be done without any moving parts, and therefore has the advantages of high reliability and low maintenance. Electronic switches, such as field effect transistors (FETs) or insulated-gate bipolar transistors (IG-FETs), can be used to change the electrical characteristic of the track so that if control power is lost, then the electronic switches will revert to a state in which a vehicle will be directed through the switch along a default path, such as the lower path for safety.

In a system that levitates the vehicles via electrical current induced in the track, the electrical characteristics of the track can be changed by disposing electrical coils in the rails of the track. For example, the electrically conductive wires of the coils follow the paths of eddy currents induced in the rails in the divergent zone of the track switch. Electronic switches either open or close the circuits of the coils in the rails in order to disable or enable the eddy currents and thus disable or enable the rails from lifting or engaging a moving vehicle in the divergent zone of the track switch. FIGS. 17 to 20 show an example of adding electrical coils 53, 54, 55, 56, 57, 58, 59, and 60 to the vertical track switch of FIGS. 2 to 5.

Figure 17:
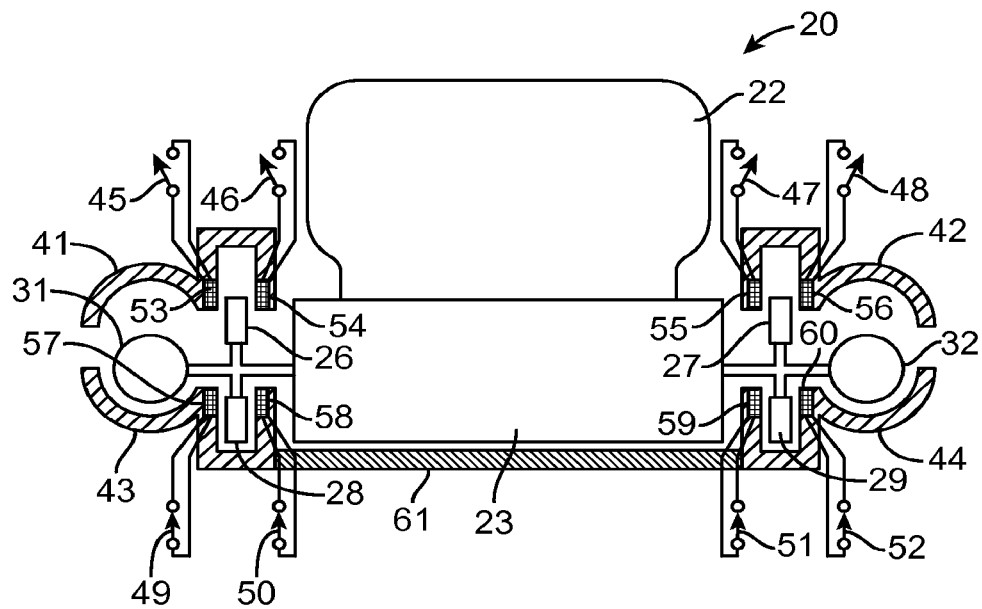
FIG. 17 shows a modification of FIG. 2 in which coils are embedded in the rails for switching the path of a vehicle through the divergent zone of the switch.

FIG. 17 shows electronic switches 45, 46, 47, 48 in an open state, and electronic switches 49, 50, 51, 52 in a closed state, when the vehicle 20 enters the divergent zone of the track switch. For example, the electronic switches 45, 46, 47, 48 include normally open enhancement-mode FETS, and the switches 49, 50, 51, 52 include normally closed depletion-mode FETS. Each electronic switch 45, 46, 47, 48 opens the circuit of a respective one of the electrical coils 53, 54, 55, 56 in a respective one of the upper rail halves 41, 42 so that the upper lifting and centering units 26, 27 become disengaged from the upper rail halves 41, 42. Each electronic switch 49, 50, 51, 52 closes the circuit of a respective one of the electrical coils 57, 58, 59, 60 mounted in a respective one of the lower rail halves 43, 44. Opening of the circuit of a coil eliminates the ability of the coil to levitate and engage the adjacent lifting and centering unit by electrical current that otherwise would be induced in the coil by motion of the adjacent lifting and centering unit. For the case of FIG. 17, the eddy currents induced in the coils 57, 58, 59, and 60 engage the lower lifting and centering units 28, 29 to guide the vehicle to the lower branch of the track switch.

Figure 18:
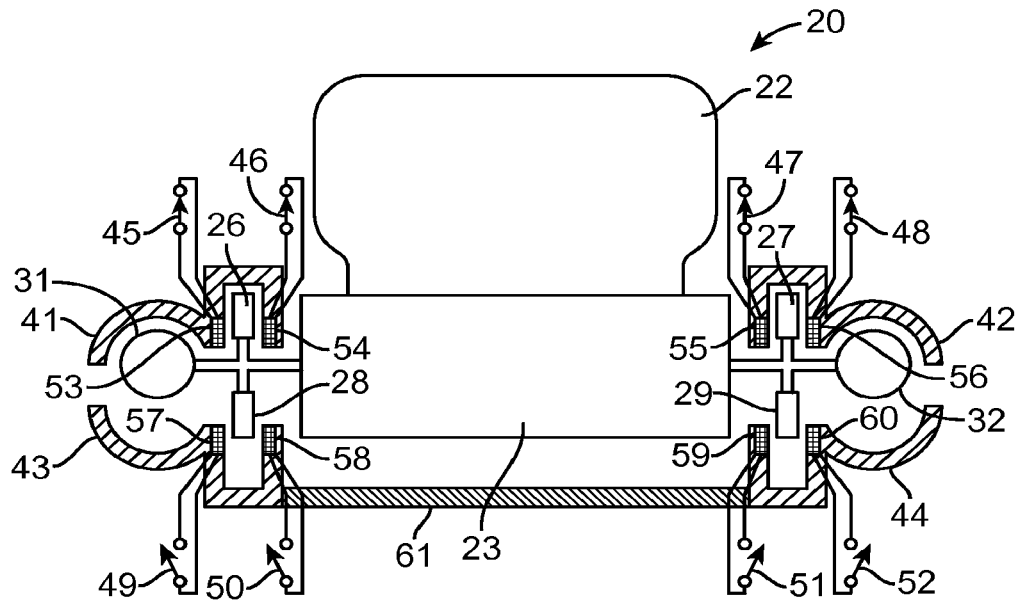
FIG. 18 shows a modification of FIG. 3 in which coils are embedded in the rails for switching the path of a vehicle through the divergent zone of the switch.

FIG. 18 shows the electronic switches 45, 46, 47, 48 in a closed state, and the electronic switches 49, 50, 51, 52 in an open state, when the vehicle 20 enters the divergent zone of the track switch. Each electronic switch 49, 50, 51, 52 opens the circuit of a respective one of the electrical coils 57, 58, 59, 60 in a respective one of the lower rail halves 43, 44 so that the lower lifting and centering units 28, 29 become disengaged from the lower rail halves 43, 44. For the case of FIG. 18, the eddy currents induced in the coils 53, 54, 55, and 56 lift and engage the upper lifting and centering units 26, 27 to guide the vehicle to the upper branch of the track switch.

Figure 19:
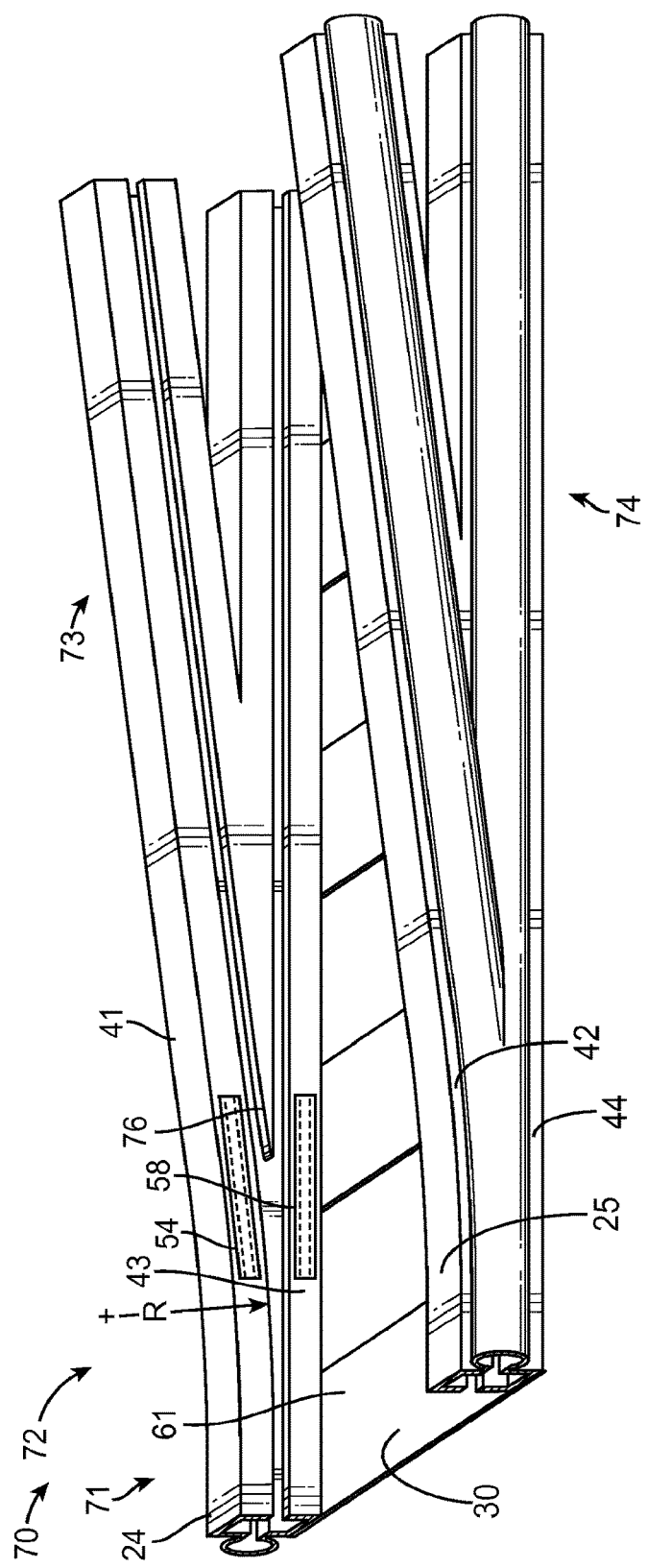
FIG. 19 shows a modification of FIG. 4 in which coils are embedded in the rails for switching the path of a vehicle through the divergent zone of the switch.

FIG. 19 shows that the divergent zone 72 includes the coils 54, 55 for selectively directing a vehicle on the trunk track 71 entering the divergent zone 72 to exit the track switch 70 on either the upper branch track 73 or the lower branch track 74.

Figure 20:
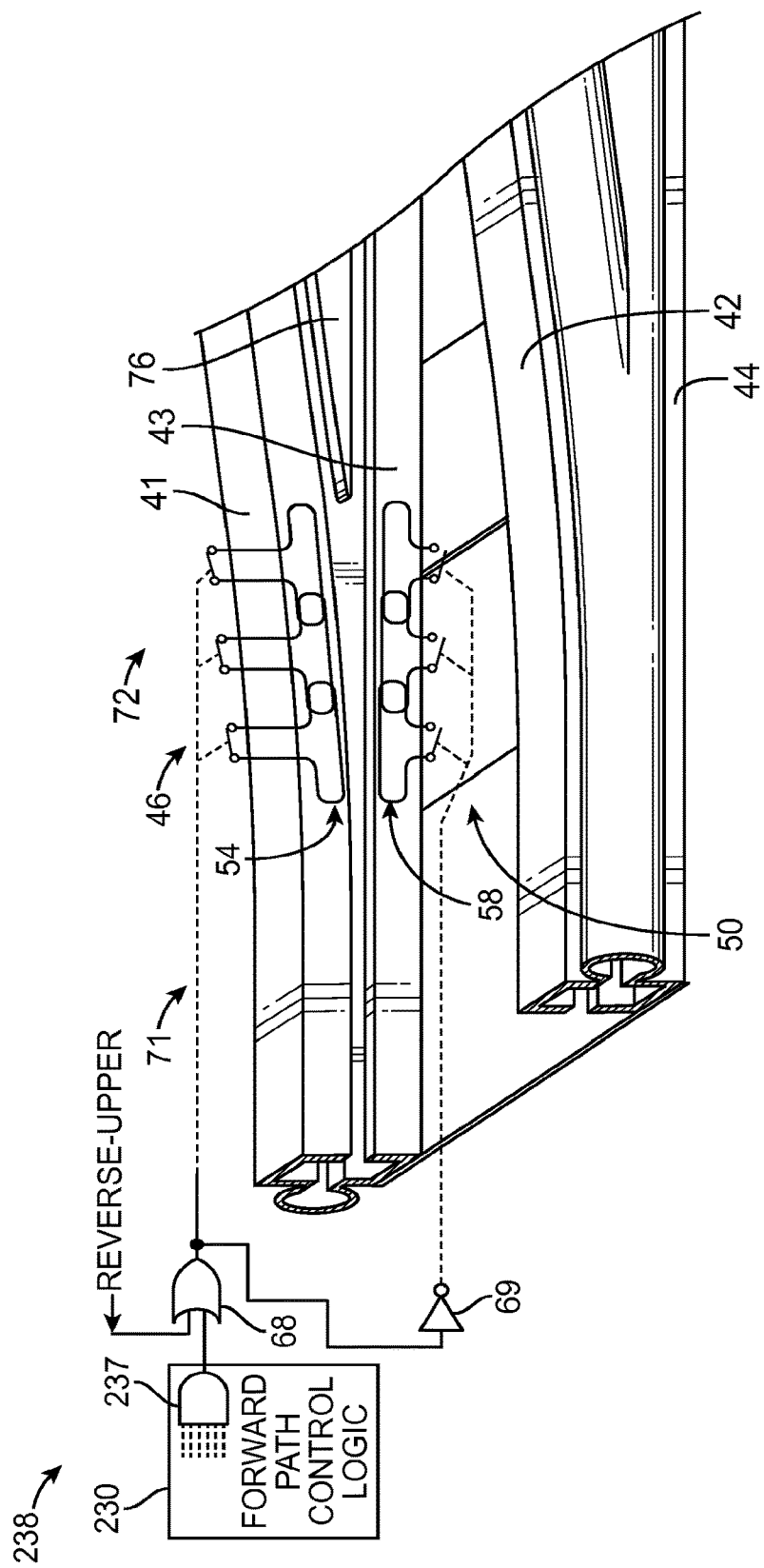
FIG. 20 an enlarged view of the divergent zone in the track switch of FIG. 19.

FIG. 20 shows that that each coil 54, 58 is comprised of a series of coils along the length of the divergent zone 72, and each electronic switch 46, 50 includes a respective electronic switch for each coil 54, 58 in the series of coils. In general, the placement of the electrically conductive wire in each coil is selected so that the wire follows the path of eddy current that would otherwise have been induced in the rail by movement of the levitation and centering units of the vehicle 20.

FIG. 20 also shows control circuitry 238 for operating the electronic switches 46, 50. The control circuitry 238 includes the forward path control logic 230 described above with reference to FIG. 16, which determines whether a vehicle entering the track switch in a forward direction from the trunk track 71 should be diverted to the upper branch 73. The control circuitry 238 also includes an OR gate 68, and an inverter 69, for enabling the electronic switches 46 to close and the electronic switches 50 to open to select the path between the trunk track 71 and the upper branch 73 when enabled by the AND gate 237 for the forward path or when enabled by a signal (REVERSE_UPPER) indicating that a vehicle is traveling in the upper branch segment 73 in the reverse direction and is about to enter the divergent zone 72.

Although FIGS. 17 to 20 show an example in which the electrical coils 53, 54, 55, 56, 57, 58, 59, and 60 are either open circuited or short circuited so that the coils are not actively powered to select a travel path through the divergent zone 73, it can be desirable in some cases to apply electrical power the upper coils 54 or the lower coils 58 when a vehicle is in the divergent zone in order to increase the magnetic levitation force upon the vehicle.

For example, the transportation system includes vehicles designated as passenger vehicles for carrying human passengers, and vehicles designated as freight vehicles that do not carry human passengers. The loading of a passenger vehicle is restricted by weight so that the levitation units of the passenger vehicle are capable of levitating twice the weight of the loaded vehicle at an operational speed over a straight segment of track, and therefore electrical power need not be applied to the upper coils 54 or the lower coils 58 when the passenger vehicle is in the divergent zone 72 in order to guide the passenger vehicle along a selected travel path between the trunk track segment 71 and either the upper branch track segment 73 or the lower branch segment 74. In this case, the required levitation force in the divergent zone can be provided by eddy current induced in either the upper coils 54 or the lower coils 58. The freight vehicles, however, can carry a greater load, and in this case an external source of electromotive force is switched in series with either the upper coils 54 or the lower coils 58 to power either the upper coils 54 or the lower coils 58 when the freight vehicle is in the divergent zone 72. The external source of electromotive force increases the amount of current in the coils 54 or 58 above the amount of the induced eddy current in order to provide an additional levitating force to carry the increased load of the freight vehicles. The external source of electromotive force, for example, is provided by an uninterruptable power supply powered by the electrical grid, and the uninterruptable power supply includes a storage battery at the location of the track switch.

FIG. 21 is a top view of a track network 80 in which two parallel, coplanar, and adjacent tracks 81, 82 are joined by an overpass 83 and a respective vertically directing track switch 84, 85 in each of the parallel tracks. FIG. 22 is a side view of the track network 80, and shows vertical supports 86, 87 for the overpass 83 and also shows that there is a height "h1" between the overpass and the tracks 81, 82 to provide sufficient clearance for vehicles traveling along the tracks 81, 82.

In the network 80, vehicles can travel in both directions along either of the tracks 81, 82 without being diverted by the track switches 84, 85. The track switches 84, 85 can selectively divert a vehicle traveling from left to right on the second track 82 over the overpass 83 to the first track 81. The track switches 84, 85 can also selectively divert a vehicle traveling from right to left on the first track 81 over the overpass 83 to the second track 82.

In FIGS. 21 and 22, the overpass 83 from one line of track joins another line of track. Such an overpass could also be used to join a mainline of track to a branch line or a local siding.

FIG. 23 shows a side view of another track network 90 in which two parallel adjacent tracks 91, 92 are spaced one on top of the other and joined by an inclined track segment 93 and a respective vertically directing track switch 94, 95 in each of the parallel adjacent tracks. In FIG. 23, this side view is in partial section along a section line extending along the tracks and bisecting the network 90 in order to show the slots 101, 102, 103 in the rails of the tracks 91, 92, 93, which provide space and clearance for the mechanical connection between the levitating, centering, and propulsion units of a vehicle and the bogie of the vehicle.

FIG. 23 also shows vertical supports 96, 97, 98 joining the tracks 91, 92, and 93. There is a height "h2" between the upper and lower tracks 91, 92 to provide sufficient clearance for vehicles traveling along the lower track 92. The upper track has crossties 104, 105 but no crossties over the inclined track segment 93 or the switches 94, 95 to provide clearance for vehicles traveling along the inclined track segment 93. The inclined track segment 93 has no crossties to provide clearance with vehicles traveling along the lower track 92. The lower track 92 has crossties 106, 107, 108, 109, 110, 111, 112, 113, 114 spaced at regular intervals.

In this network of FIG. 23, vehicles can travel from left to right and from right to left along the upper track 91 and along the lower track 92. Vehicles can also travel from left to right beginning on the lower track 92 and up the inclined track segment 93 to the upper track 91, and vehicles can travel from right to left beginning on the upper track 91 and down the inclined track 93 to the lower track 92.

The network 90 of FIG. 23 could be used to conserve roadway space, for example over a bridge or through a city. The network of FIG. 23 could also be used to permit fast, lightly-loaded vehicles to pass over slower, heavily-loaded vehicles. In this case, the slower, heavily-loaded vehicles would use the lower track 92, and the fast, lightly-loaded vehicles would use the upper track 91 as an "express lane" to pass over the slower vehicles on the lower track.

Figure 24:
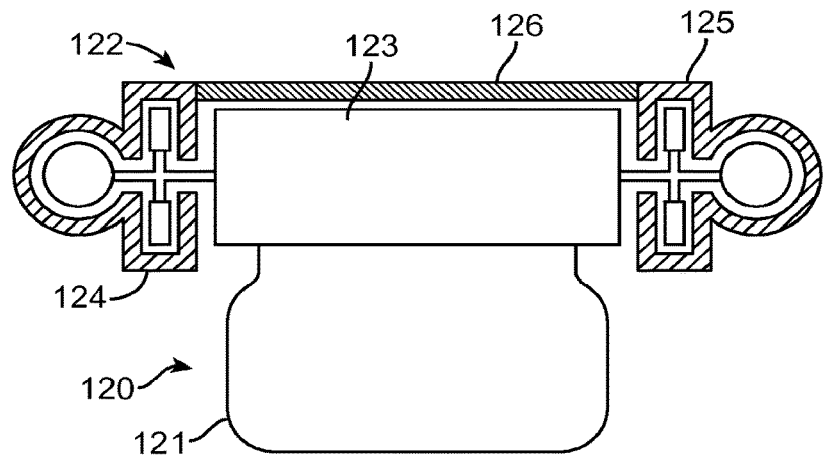
FIG. 24 shows an alternative construction similar to FIG. 1 but in which a passenger or freight cabin is suspended from the track.

FIG. 24 shows an alternative construction similar to FIG. 1 but in which a vehicle 120 has a passenger or freight cabin 121 suspended from the track 122. The vehicle 120 has a bogie 123 and levitating, centering, and propulsion units similar to the bogie 23 and levitating, centering, and propulsion units shown in FIG. 1. The track 122 has a pair of coextensive spaced rails 124, 125 similar to the rails 24 and 25 shown in FIG. 1.

The width of the cabin 121 is less than the spacing between the rails 124, 125 to provide sufficient clearance between the cabin and the rails of the lower branch track of a vertically divergent track switch. In this example, a crosstie 126 joins the rails 122, 125 at the top of the rails. Except at the location of a vertically divergent track switch branching upward, the crosstie 126 can be extended to span the length of the rails 124, 125 to provide a roof over the slots into the rails. This has the advantage of preventing debris from falling into the internal cavities of the rails 124, 125. Also solar panels could be mounted on top of the roof.

The vehicle 120 would pass freely through a track network of the kind shown in FIGS. 21 and 22 provided that an underpass would join the tracks 81 and 82 instead of the overpass 83. In other words, the entire network 80 would be turned upside-down. The vehicle 120 would also pass through the a track network of the kind shown in FIG. 23 provided that the entire network 90 in FIG. 23 were turned upside-down.

Figure 25:
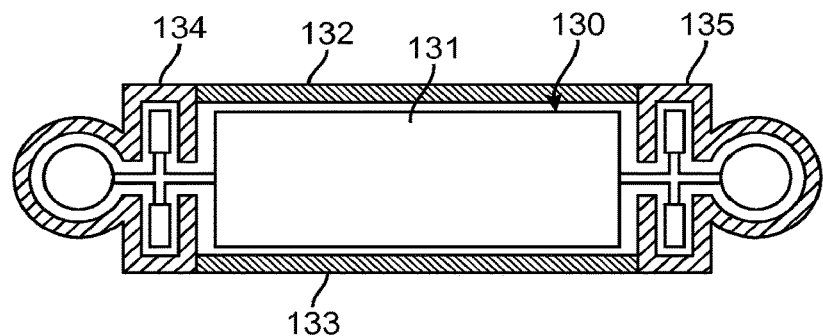
FIG. 25 shows an alternative construction similar to FIG. 1 but in which a freight container is guided inside an enclosure between the two rails of the track.

FIG. 25 shows an alternative construction similar to FIG. 1 but in which a vehicle 130 does not have a passenger or freight cabin and instead the bogie 131 of the vehicle is used as a freight container. The bogie 131 and levitating, centering, and propulsion units of the vehicle 130 are similar to the bogie 23 and the levitating, centering, and propulsion units shown in FIG. 1. In this example, crossties 132, 133 join the tops and bottoms of the rails 134, 135. The crossties 132, 133 can be extended along the rails to provide a sealed transport tube through which the vehicle 130 travels. Also the branch tracks, inclines, or overpasses in a track network can be sealed in this fashion. This would prevent debris from entering the transport tubes and would prevent collisions between vehicles in the tubes and other vehicles or people outside of the tubes.

A track network incorporating the vertically divergent track switches can be designed so that some or all of the network can transport the different kinds of the vehicles shown in FIGS. 1, 24, and 25. The vehicle 130 is the most accommodating and would pass freely through any portion of a network that wound accommodate the vehicle 20 in FIG. 1 or the vehicle 120 in FIG. 24. In addition, a track network can be designed to accommodate all of the vehicles of FIGS. 1, 24, and 25 by removing the crossties and replacing them, if possible, with arches through which the passenger or freight cabins of the vehicles 20 and 120 would freely pass.

Figure 26:
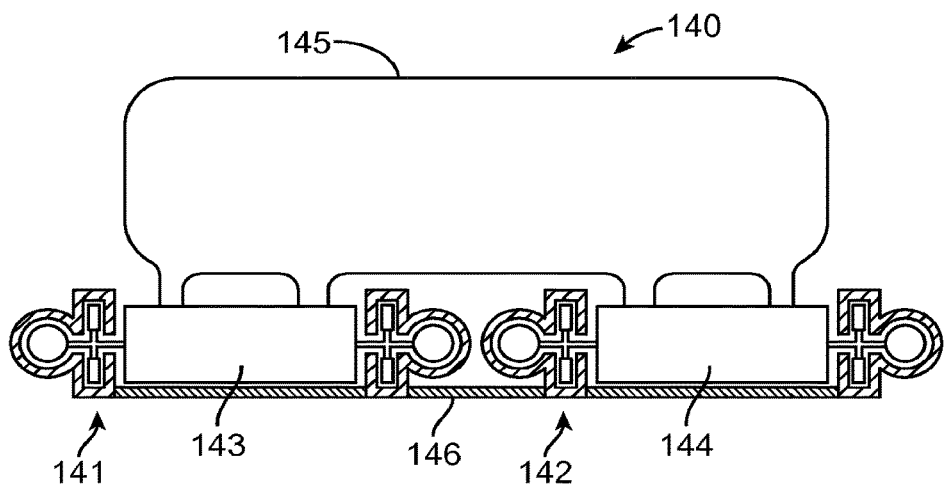
FIG. 26 shows an alternative construction in which a double-wide vehicle is supported on and guided by two parallel, coplanar, and adjacent tracks.

FIG. 26 shows an alternative construction in which a double-wide vehicle 140 is supported on and guided by two parallel, coplanar, adjacent, and joined tracks 141, 142. The vehicle 140 has a first bogie 143 engaging the two rails of the first track 141, a second bogie 144 engaging the two rails of the second track 142, and a cabin 145 mounted to the first bogie 143 and the second bogie 144. The two tracks 141, 142 are joined by a crosstie 146. A track network incorporating the vertically divergent track switches can be designed so that the network would accommodate the double-wide vehicle 140 as well as the single-wide vehicles 20, 120, and 130. For example, such a network could include a vertically-divergent track switch joined to the track 141 or 142 in which the track 141 or 142 would incorporate the trunk track segment and the upper branch track segment of the track switch. In this case, single-wide vehicles could be diverted downward from the joined tracks 141, 142, while double-wide vehicles would never be diverted downward from the joined tracks 141, 142.

In a similar fashion, a double-wide vehicle could be constructed that would be similar to the vehicle 140 but the passenger or freight cabin 145 would be suspended from the bogies 143, 144. In other words, a picture of this double-wide vehicle would result by turning FIG. 26 upside down. In this case, a track network incorporating the vertically divergent track switches could be designed so that the network would accommodate this double-wide vehicle 140 as well as the single-wide vehicles 20, 120, and 130 by diverting the single-wide vehicles upward from the joined tracks, while this double-side vehicle would never be diverted upward from the joined tracks.

Figure 27:
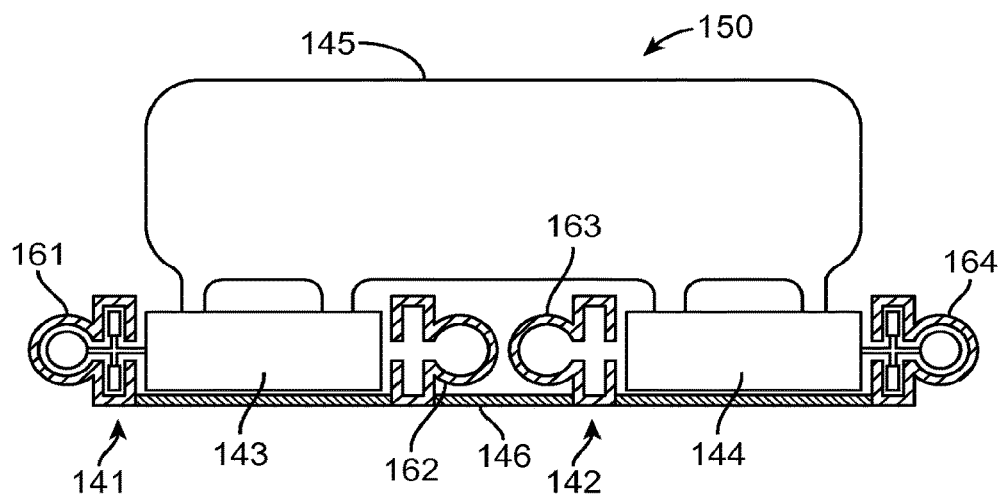
FIG. 27 shows a variation of the double-wide vehicle of FIG. 26 in which the central propulsion and levitation units have been removed so that the double-wide vehicle does not engage the central rails of the two parallel tracks.

FIG. 27 shows an alternative construction of a double-wide vehicle 150, which is supported on the outer rails 161, 164 but not the inner rails 162, 163 of the two parallel, coplanar, adjacent, and joined tracks 141, 142. This alternative construction 150 could be used in a network that would include a top level of double-wide track. In this case, the double-wide vehicle 150 but not single-wide vehicles could be diverted from the double track 141, 142 of FIG. 27 to the top level of double wide track through divergent zones that would join rails of the upper level of double-wide track to the outer rails 161 and 164 shown in FIG. 27.

Figure 28:
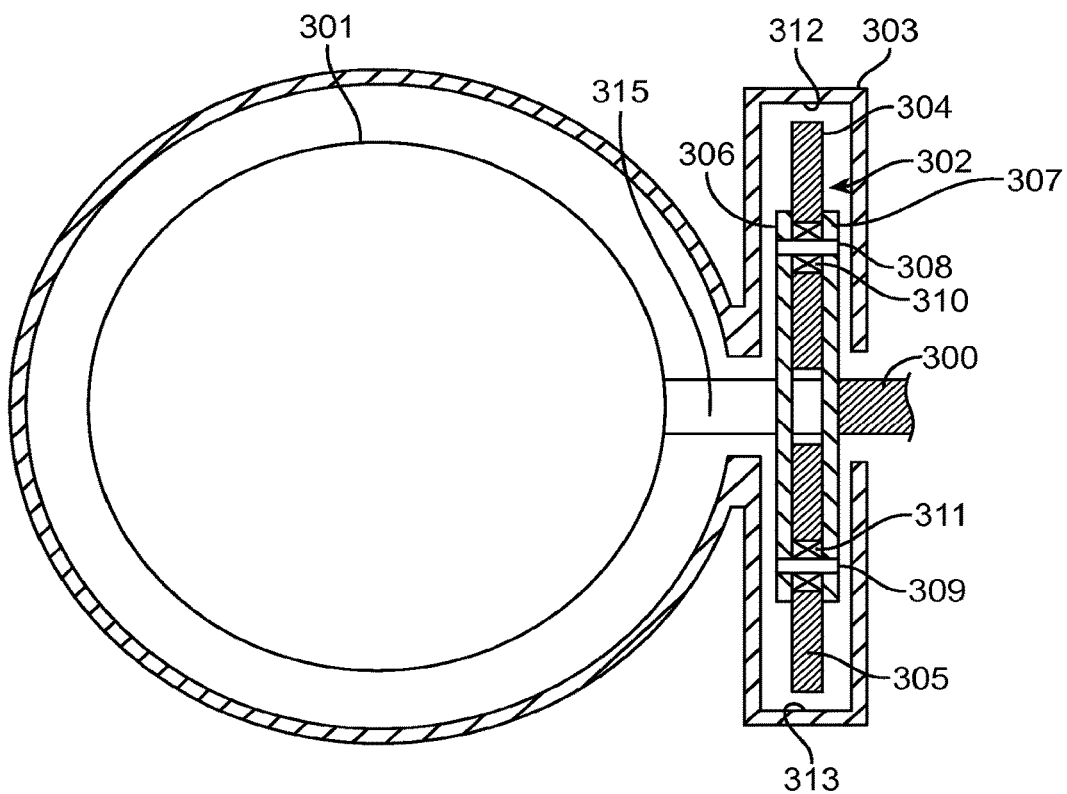
FIG. 28 shows a cross-section of an alternative construction of a levitation unit engaged in a rail and having rollers integrated with the levitation unit.

FIG. 28 shows an alternative construction in which rollers 304, 305 are integrated with a levitation unit 302. In this example the levitation unit 302 is separate from a propulsion unit 301, and the levitation unit and the propulsion unit are disposed in a rail 303. The propulsion unit 301 is mounted to a vehicle (not shown) by at least one support rod 315 passing through the levitation unit 302. The levitation unit 302 is mounted to the vehicle by a control shaft 300 in the fashion shown in FIGS. 7 and 8.

In the example of FIG. 28, the levitation unit 30 includes two elongated rectangular metal plates 306, 307 so that the rollers 304, 305 are partially sandwiched between the plates. The rollers 304, 305 are mounted via respective shafts 308, 309 and bearings 310, 311. The lower roller 305 would support some weight of the vehicle if the magnetic levitation were insufficient to support the weight of the vehicle. In this case the lower roller 305 would contact the lower internal surface 313 of the rail 303. The upper roller 304 could contact the upper internal surface 312 of the rail 303 if the magnetic levitating force would exceed the weight of the vehicle. Therefore the rollers 304, 305 provide limit stops preventing sliding contact between the rail 303 and the propulsion unit 301, the levitation unit 302, and the supporting structure including the control shaft 300 and the support rod 315 if the control of the levitation unit 302 fails to provide sufficient clearance due to the bogie of the vehicle becoming too high or too low with respect to the rail 303.

Figure 29:
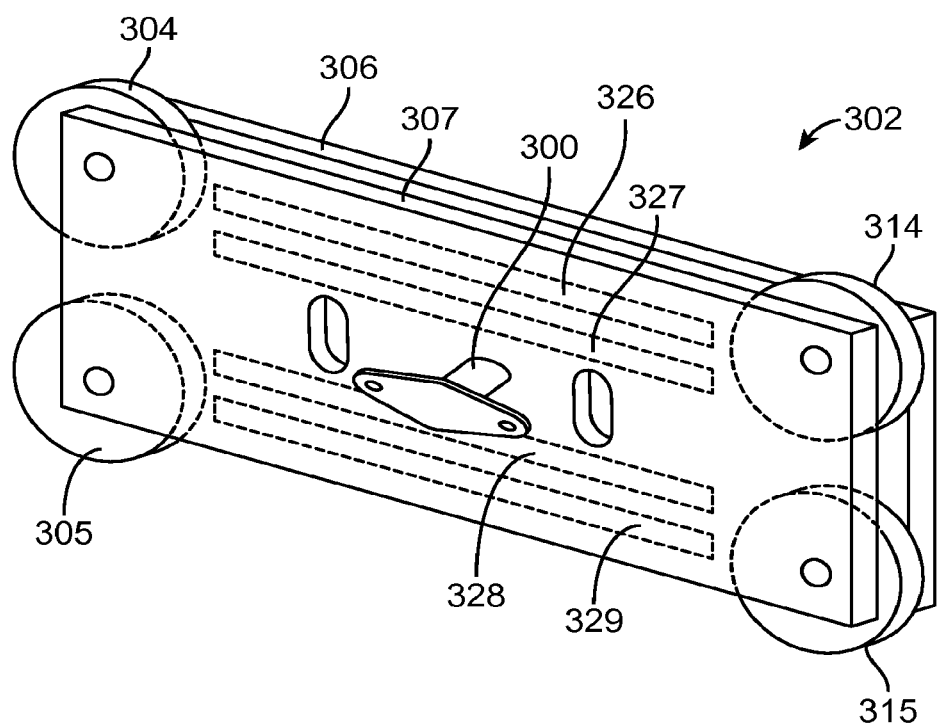
FIG. 29 shows a perspective view of the levitation unit introduced in FIG. 28.

A single pair of the rollers 304, 305 could be mounted between the ends of the elongated rectangular plates 306, 307 above and below the control shaft 300. However, as shown in FIG. 29, a rear pair of the rollers 304, 305 is mounted at a rear end of levitation unit 302, and a front pair of similar rollers 314, 315 is mounted at a front end of the levitation unit 302. The rollers 304, 305, 314, 315 take up some space that would otherwise be occupied by magnets for the elongated magnetic poles 326, 317, 318, 319 sandwiched between the metal plates 306, 307. In this case the rollers at each end of the levitation unit 302 could contact the upper and lower inner surfaces 312, 313 of the rail 303 to provide limit stops to inclination of the levitation unit 302. Such limit stops could be reached in the normal course of guiding the vehicle along the travel path through the vertical track switch 70 of FIG. 4 between the trunk track segment 71 and the upper branch segment 73.

In view of the above, there has been described a vertically directing track switch for a system having tracks comprised of coextensive spaced rails. The vertically directing track switch provides many performance advantages including a reduction or elimination of moving parts, reduction of control system complexity, reduction of dynamic behavior complexity, reduction of magnet mass, enabling of top-riding as well as bottom-riding configurations, provisions for ground-level guideways and walkways level with the guideways, enabling a free-rolling condition for vehicle travel below levitation speed, and enabling compatibility with different kinds of vehicles within a single system.

What is claimed is:

1. A track switch for a levitation transport system comprising:
   a non-movable trunk segment of track configured to receive one or more levitation generators;
   a non-movable upper branch segment of track configured to optionally receive the one or more levitation generators;
   a non-movable lower branch segment of track configured to optionally receive the one or more levitation generators; and
   a divergent zone mechanically connecting the non-movable trunk segment of track to the non-movable upper branch segment of track and the non-movable lower branch segment of track, the divergent zone having coextensive spaced rails extending from the non-movable trunk segment of track and splitting vertically into upper rails extending to the non-movable upper branch segment of track, and lower rails extending to the non-movable lower branch segment of track,
   wherein each of the lower rails and the upper rails are configured to to produce a portion of a levitation force on a vehicle to guide the vehicle to a selected one of the non-movable upper branch segment of track or the non-movable lower branch segment of track.

2. The track switch as claimed in claim 1, wherein the divergent zone includes electrical wire coils mounted to the coextensive spaced rails and electrical switches electrically connected to the electrical wire coils for selecting a travel path of the vehicle between the non-movable trunk segment of track and either the non-movable upper branch segment of track or the non-movable lower branch segment of track.

3. The track switch as claimed in claim 2, wherein the electrical wire coils include a first set of coils mounted to the upper rails and a second set of coils mounted to the lower rails.

4. The track switch as claimed in claim 3, wherein the electrical switches include a first set of switches electrically connected to the first set of coils to short circuit the first set of coils for selecting travel between the non-movable trunk segment of track or the non-movable upper branch segment of track, and a second set of switches electrically connected to the second set of coils to short circuit the second set of coils for selecting travel between the non-movable trunk segment of track or the non-movable lower branch segment of track.

5. The track switch as claimed in claim 4, wherein the first set of switches has an open state in an absence of power for controlling the electrical switches, and the second set of switches has a closed state in the absence of power for controlling the electrical switches.

6. The track switch as claimed in claim 1, further comprising a switch controller for selecting one of the non-movable upper branch segment of track or the non-movable lower branch segment of track, the switch controller including a vehicle speed sensor for sensing a speed of the vehicle entering the track switch at the non-movable trunk segment of track, and a first comparator electrically connected to the vehicle speed sensor for comparing the speed of the vehicle to a first threshold and selecting the non-movable lower branch segment of track when the speed does not exceed the first threshold.

7. The track switch as claimed in claim 6, wherein the switch controller further includes control logic for selecting the non-movable upper branch segment of track for the vehicle entering the track switch at the non-movable upper branch segment of track.

8. The track switch as claimed in claim 6, wherein the switch controller further includes a vibration sensor for sensing a vibration of the vehicle entering the track switch at the non-movable trunk segment of track, and a second comparator electrically connected to the vibration sensor for comparing the vibration of the vehicle to a second threshold and selecting the non-movable lower branch segment of track when the vibration exceeds the second threshold.

9. The track switch as claimed in claim 6, wherein the switch controller further includes a proximity sensor for sensing a clearance between the track switch and the vehicle entering the track switch at the non-movable trunk segment of track, and a third comparator electrically connected to the proximity sensor for comparing the clearance to a third threshold and selecting the non-movable lower branch segment of track when the clearance does not exceed the third threshold.

10. A track switch for a magnetic levitation transport system, said track switch comprising
   a non-movable trunk segment of track;
   a non-movable upper branch segment of track;
   a non-movable lower branch segment of track; and
   a divergent zone mechanically connecting the non-movable trunk segment of track to the non-movable upper branch segment of track and to the non-movable lower branch segment of track, the divergent zone having coextensive spaced rails extending from the non-movable trunk segment of track and splitting vertically into upper rails extending to the non-movable upper branch segment of track, and lower rails extending to the non-movable lower branch segment of track, so that a vehicle engaging one of the upper rails or the lower rails is guided and magnetically levitated while traveling from the non-movable upper branch segment of track to the non-movable trunk segment of track, while traveling from the non-movable lower branch segment of track to the non-movable trunk segment of track, or while traveling from the non-movable trunk segment of track to a selected one of the non-movable upper branch segment of track or the non-movable lower branch segment of track.

11. The track switch as claimed in claim 10, wherein the divergent zone includes electrical wire coils mounted to the coextensive spaced rails and electrical switches electrically connected to the electrical wire coils for selecting a travel path of the vehicle between the non-movable trunk segment of track and either the non-movable upper branch segment of track or the non-movable lower branch segment of track.

12. The track switch as claimed in claim 11, wherein the electrical wire coils include a first set of coils mounted to the upper rails and a second set of coils mounted to the lower rails.

13. The track switch as claimed in claim 12, wherein the electrical switches include a first set of switches electrically connected to the first set of coils to short circuit the first set of coils for selecting travel between the non-movable trunk segment of track or the non-movable upper branch segment of track, and a second set of switches electrically connected to the second set of coils to short circuit the second set of coils for selecting travel between the non-movable trunk segment of track or the non-movable lower branch segment of track.

14. The track switch as claimed in claim 13, wherein the first set of switches has an open state in an absence of power for controlling the electrical switches, and the second set of switches has a closed state in the absence of power for controlling the electrical switches.

15. The track switch as claimed in claim 10, further comprising a switch controller for selecting one of the non-movable upper branch segment of track or the non-movable lower branch segment of track, the switch controller including a vehicle speed sensor for sensing a speed of the vehicle entering the track switch at the non-movable trunk segment of track, and a first comparator electrically connected to the vehicle speed sensor for comparing the speed of the vehicle to a first threshold and selecting the non-movable lower branch segment of track when the speed does not exceed the first threshold.

16. The track switch as claimed in claim 15, wherein the switch controller further includes control logic for selecting the non-movable upper branch segment of track for the vehicle entering the track switch at the non-movable upper branch segment of track.

17. The track switch as claimed in claim 15, wherein the switch controller further includes a vibration sensor for sensing a vibration of the vehicle entering the track switch at the non-movable trunk segment of track, and a second comparator electrically connected to the vibration sensor for comparing the vibration of the vehicle to a second threshold and selecting the non-movable lower branch segment of track when the vibration exceeds the second threshold.

18. The track switch as claimed in claim 15, wherein the switch controller further includes a proximity sensor for sensing a clearance between the track switch and the vehicle entering the track switch at the non-movable trunk segment of track, and a third comparator electrically connected to the proximity sensor for comparing the clearance to a third threshold and selecting the non-movable lower branch segment of track when the clearance does not exceed the third threshold.

19. A magnetic levitation transport system comprising at least one vehicle, segments of track, and at least one track switch joining the segments of track, said at least one track switch comprising a non-movable trunk segment of track, a non-movable upper branch segment of track, a non-movable lower branch segment of track, and a divergent zone mechanically connecting the non-movable trunk segment of track to the non-movable upper branch segment of track and to the non-movable lower branch segment of track, and having coextensive spaced rails extending from the non-movable trunk segment of track and splitting vertically into upper rails extending to the non-movable upper branch segment of track, and lower rails extending to the non-movable lower branch segment of track, so that when the vehicle engages one of the upper rails or the lower rails, the vehicle is guided and magnetically levitated while traveling from the non-movable upper branch segment of track to the non-movable trunk segment of track, while traveling from the non-movable lower branch segment of track to the non-movable trunk segment of track, or while traveling from the non-movable trunk segment of track to a selected one of the non-movable upper branch segment of track or the non-movable lower branch segment of track.

20. The magnetic levitation transport system as claimed in claim 19, further comprising a switch controller for selecting one of the non-movable upper branch segment of track or the non-movable lower branch segment of track, the switch controller including a vehicle speed sensor for sensing a speed of the vehicle when the vehicle enters the track switch at the non-movable trunk segment of track, and a comparator electrically connected to the vehicle speed sensor for comparing the speed of the vehicle to a threshold and selecting the non-movable lower branch segment of track when the speed does not exceed the threshold.

* * * * *